US012453427B2

(12) United States Patent
Smith

(10) Patent No.: US 12,453,427 B2
(45) Date of Patent: Oct. 28, 2025

(54) THERAPEUTIC MATTRESS

(71) Applicant: TummyTime Mattress, LLC, Florence, KY (US)

(72) Inventor: D. Lamont Smith, Florence, KY (US)

(73) Assignee: TummyTime Mattress, LLC, Florence, KY (US)

( * ) Notice: Subject to any disclaimer, the term of this patent is extended or adjusted under 35 U.S.C. 154(b) by 234 days.

(21) Appl. No.: 18/332,742

(22) Filed: Jun. 11, 2023

(65) Prior Publication Data

US 2023/0309706 A1 Oct. 5, 2023

Related U.S. Application Data

(63) Continuation-in-part of application No. 16/127,127, filed on Sep. 10, 2018, now abandoned.

(51) Int. Cl.

| | |
|---|---|
| ***A47C 27/08*** | (2006.01) |
| ***A47C 21/04*** | (2006.01) |
| ***A47C 27/14*** | (2006.01) |
| ***A47G 9/10*** | (2006.01) |
| ***G01L 9/00*** | (2006.01) |

(52) U.S. Cl.
CPC ............ *A47C 27/08* (2013.01); *A47C 21/042* (2013.01); *A47C 21/048* (2013.01); *A47C 27/146* (2013.01); *A47G 9/1036* (2013.01); *A47G 9/1054* (2013.01); *G01L 9/00* (2013.01); *A47C 21/04* (2013.01); *A47C 27/142* (2013.01)

(58) Field of Classification Search
CPC ....... A47C 27/08; A47C 27/14; A47C 27/142; A47C 27/146; A47C 21/04; A47C 21/042; A47C 21/044; A47C 21/046; A47C 21/048; A47G 9/1036; A47G 9/1054; A47G 9/1045; G01L 9/00
USPC ..................... 5/690, 725, 421, 636–638, 724
See application file for complete search history.

(56) References Cited

U.S. PATENT DOCUMENTS 2,244,435 A * 6/1941 Simons ................ A47C 27/125 5/725
2,810,920 A * 10/1957 Carruth ................ A47C 20/026 5/725
3,648,469 A * 3/1972 Chapman ............... H10N 10/00 5/636
4,536,906 A 8/1985 Varndell et al.
(Continued)

FOREIGN PATENT DOCUMENTS

CA 3163452 A1 * 7/2021 ........... A47C 27/081
EP 3659566 A1 * 6/2020 ............ A61M 21/02
(Continued)

*Primary Examiner* — Robert G Santos
(74) *Attorney, Agent, or Firm* — Jenei LLC

(57) ABSTRACT

The present invention discloses a therapeutic mattress. The mattress comprises a mattress body comprising a head of bed section and a foot of bed section, one or more apertures configured at the mattress body and a support frame having a support surface disposed within each aperture. The support frame comprises an air passage area therethrough. The mattress further comprises a first pillow removably disposed above the support surface and within the aperture. The first pillow has a C-shaped configuration. The first pillow is configured to expose a user's head to the air passage area while lying on the mattress facing downwards and enables the user to comfortably rest.

11 Claims, 8 Drawing Sheets

(56) References Cited

U.S. PATENT DOCUMENTS

| | | | | |
|---|---|---|---|---|
| 5,375,278 | A * | 12/1994 | VanWinkle | A47G 9/10 5/951 |
| 5,545,199 | A * | 8/1996 | Hudson | A47G 9/1081 5/636 |
| 5,584,086 | A * | 12/1996 | VanWinkle | A61F 7/02 5/636 |
| 6,128,797 | A | 10/2000 | Shaffer | |
| 6,175,981 | B1 | 1/2001 | Lizama et al. | |
| 6,691,354 | B1 | 2/2004 | Sheppard | |
| 6,854,144 | B1 | 2/2005 | Mehring, Jr. | |
| 7,543,345 | B2 | 6/2009 | Wilson et al. | |
| 7,614,105 | B1 | 11/2009 | Jackson et al. | |
| 10,448,749 | B2 * | 10/2019 | Palashewski | A61B 5/6892 |
| 10,827,846 | B2 * | 11/2020 | Karschnik | A61B 5/6892 |
| 11,399,636 | B2 * | 8/2022 | Demirli | A47C 31/123 |
| 11,424,646 | B2 * | 8/2022 | Holmvik | H02J 50/12 |
| 11,678,749 | B2 * | 6/2023 | Grabinger | A47C 27/082 5/423 |
| 11,684,166 | B2 * | 6/2023 | Grabinger | A47C 21/048 5/613 |
| 11,684,167 | B2 * | 6/2023 | Karschnik | A47C 31/007 5/710 |
| 11,684,168 | B2 * | 6/2023 | Karschnik | G16H 40/63 5/421 |
| 11,779,128 | B2 * | 10/2023 | Griffith | A47C 21/048 5/423 |
| 11,844,433 | B2 * | 12/2023 | Karschnik | A47C 27/15 |
| 11,889,925 | B2 * | 2/2024 | Karschnik | A47C 27/083 |
| 11,896,134 | B2 * | 2/2024 | Grabinger | A47C 27/10 |
| 11,918,119 | B2 * | 3/2024 | Karschnik | A47C 27/082 |
| 11,925,270 | B2 * | 3/2024 | Demirli | A61B 5/1114 |
| 11,930,934 | B2 * | 3/2024 | Karschnik | A47C 31/001 |
| 11,937,701 | B2 * | 3/2024 | Karschnik | A47C 31/007 |
| 11,962,164 | B2 * | 4/2024 | Holmvik | H02J 50/402 |
| 12,127,678 | B2 * | 10/2024 | Sayadi | A61B 5/01 |
| 12,193,575 | B2 * | 1/2025 | Karschnik | G05B 19/0426 |
| 2003/0109908 | A1 | 6/2003 | Lachenbruch et al. | |
| 2004/0237206 | A1 | 12/2004 | Webster et al. | |
| 2016/0100696 | A1 * | 4/2016 | Palashewski | A61B 5/6892 5/706 |
| 2017/0143254 | A1 * | 5/2017 | Bell | A61B 5/4815 |
| 2018/0042409 | A1 | 2/2018 | Johnson | |
| 2018/0116415 | A1 * | 5/2018 | Karschnik | A47C 27/15 |
| 2018/0132635 | A1 * | 5/2018 | Loos | A61M 21/00 |
| 2019/0201270 | A1 * | 7/2019 | Sayadi | A47C 21/044 |
| 2020/0078242 | A1 * | 3/2020 | Smith | A61B 5/024 |
| 2020/0315367 | A1 * | 10/2020 | Demirli | A61B 5/1495 |
| 2020/0336010 | A1 * | 10/2020 | Holmvik | A47C 27/082 |
| 2020/0337470 | A1 * | 10/2020 | Sayadi | A47C 21/04 |
| 2021/0204706 | A1 * | 7/2021 | Karschnik | A47C 31/005 |
| 2021/0204709 | A1 * | 7/2021 | Grabinger | A47C 31/005 |
| 2021/0204710 | A1 * | 7/2021 | Grabinger | A47C 27/081 |
| 2021/0204711 | A1 * | 7/2021 | Karschnik | A47C 27/10 |
| 2021/0204712 | A1 * | 7/2021 | Karschnik | A47C 31/005 |
| 2021/0204713 | A1 * | 7/2021 | Karschnik | A47C 27/083 |
| 2021/0204714 | A1 * | 7/2021 | Karschnik | A47C 20/041 |
| 2021/0204715 | A1 * | 7/2021 | Karschnik | A47C 27/14 |
| 2021/0204716 | A1 * | 7/2021 | Griffith | A47C 31/007 |
| 2021/0204719 | A1 * | 7/2021 | Grabinger | G16H 40/63 |
| 2021/0204720 | A1 * | 7/2021 | Karschnik | A47C 31/007 |
| 2021/0289947 | A1 * | 9/2021 | Karschnik | A61G 7/05 |
| 2022/0261020 | A1 * | 8/2022 | Garcia Molina | A61B 5/02405 |
| 2023/0018558 | A1 * | 1/2023 | Demirli | A61B 5/1495 |
| 2023/0046169 | A1 * | 2/2023 | Garcia Molina | A61B 5/4812 |
| 2023/0054736 | A1 * | 2/2023 | Holmvik | A47C 21/003 |
| 2023/0148762 | A1 * | 5/2023 | Karschnik | A47C 21/003 5/713 |
| 2023/0181104 | A1 * | 6/2023 | Johnston | A47C 31/008 128/845 |
| 2023/0276948 | A1 * | 9/2023 | Karschnik | A47C 21/044 5/421 |
| 2023/0309706 | A1 * | 10/2023 | Smith | A61G 7/072 5/690 |
| 2023/0329583 | A1 * | 10/2023 | Garcia Molina | A61B 5/1115 |
| 2023/0363963 | A1 * | 11/2023 | Sayadi | A47C 21/048 |
| 2023/0404278 | A1 * | 12/2023 | Karschnik | A47C 27/081 |
| 2023/0404279 | A1 * | 12/2023 | Karschnik | G05B 19/0426 |
| 2024/0016301 | A1 * | 1/2024 | Karschnik | A47C 21/048 |
| 2024/0090677 | A1 * | 3/2024 | VerBockel | A47C 21/00 |
| 2024/0090678 | A1 * | 3/2024 | Saycocie | A47C 21/044 |
| 2024/0091487 | A1 * | 3/2024 | Garcia Molina | A61B 5/6892 |
| 2024/0138579 | A1 * | 5/2024 | Karschnik | A47C 21/048 |
| 2024/0283294 | A1 * | 8/2024 | Holmvik | H02J 50/402 |
| 2024/0292959 | A1 * | 9/2024 | Demirli | H04L 67/125 |
| 2025/0072628 | A1 * | 3/2025 | Palerm | A47C 21/044 |
| 2025/0120516 | A1 * | 4/2025 | Sayadi | A47C 31/123 |
| 2025/0151918 | A1 * | 5/2025 | Karschnik | A47C 20/041 |
| 2025/0160529 | A1 * | 5/2025 | Karschnik | A47C 31/007 |
| 2025/0194809 | A1 * | 6/2025 | Garcia Molina | A47C 31/123 |
| 2025/0195824 | A1 * | 6/2025 | Garcia Molina | A61M 21/02 |

FOREIGN PATENT DOCUMENTS

| | | | | | |
|---|---|---|---|---|---|
| EP | 3773080 | B1 * | 6/2022 | A47C 21/003 |
| EP | 4084652 | B1 * | 4/2023 | A47C 31/007 |
| EP | 4230086 | A1 * | 8/2023 | A47C 21/044 |
| EP | 3731702 | B1 * | 4/2025 | A61G 7/015 |
| WO | WO-2018081096 | A1 * | 5/2018 | A61B 5/4809 |
| WO | WO-2020209904 | A1 * | 10/2020 | G06F 3/017 |
| WO | WO-2020214219 | A1 * | 10/2020 | H02J 50/12 |
| WO | WO-2020219117 | A1 * | 10/2020 | A47C 21/044 |
| WO | WO-2021138527 | A2 * | 7/2021 | G05B 19/4155 |
| WO | WO-2022173514 | A1 * | 8/2022 | G05D 23/1931 |
| WO | WO-2023018706 | A1 * | 2/2023 | A61B 5/4806 |
| WO | WO-2023086476 | A1 * | 5/2023 | A47C 27/082 |
| WO | WO-2023167714 | A1 * | 9/2023 | A47C 21/044 |
| WO | WO-2023200651 | A1 * | 10/2023 | G16H 50/20 |
| WO | WO-2024059250 | A1 * | 3/2024 | A47C 31/001 |
| WO | WO-2024064185 | A1 * | 3/2024 | A47C 21/044 |

* cited by examiner

THERAPEUTIC MATTRESS

CROSS-REFERENCE TO RELATED APPLICATIONS

The present Application for Patent is a continuation-in-part (CIP) of patent application Ser. No. 16/127,127 entitled "THERAPEUTIC MATTRESS" filed Sep. 10, 2018, pending, the contents of which are hereby incorporated by reference in their entirety for any purpose.

TECHNICAL FIELD

The present disclosure relates generally to a mattress, and more particularly, to a therapeutic mattress.

BACKGROUND

In more modern times, mattresses of nearly every conceivable configuration have been created to meet the needs of different sleeping types and even to help injured and/or sick persons to better recover. Such mattresses, especially in developed locales, are made from natural materials, man-made materials and composites thereof. Some modern mattresses have sensors that seemingly sense or hear when a user is snoring so as to change the elevation thereof to end a sleeper's snoring. For example, a conventional mattress generally includes a set of metal springs or coils mounted either on a base under a pad, or sandwiched in the center of a pair of pads. The metal springs and pad or pads are then covered with a strapping material. The entire structure is then sewn into a cloth cover or overlays and the edges are wrapped and sewn.

While such mattresses and overlays according to the prior art provide a number of advantageous features, they nevertheless have certain limitations. For example, the user could not rest facing downwards with respect to the mattress, as the conventional mattress lacks to provide provisions to breathe while facing downwards.

Therefore, there is a need for a therapeutic mattress that allows the user to sleep or rest comfortably while facing upwards, downwards, or in any other orientation.

SUMMARY OF THE INVENTION

The present invention discloses a therapeutic mattress. The mattress comprises a mattress body comprising a head of bed section and a foot of bed section, one or more apertures configured at the mattress body and a support frame having a support surface disposed within each aperture. The support frame comprises an air passage area therethrough. The mattress further comprises a first pillow removably disposed above the support surface and within the aperture. The first pillow has a C-shaped configuration. In one embodiment, the support surface has a C-shaped surface to support the first pillow. The first pillow is configured to expose a user's head to the air passage area while lying on the mattress facing downwards and enables the user to comfortably rest.

In one embodiment, the mattress is a constructed as a type of conventional mattress type, for example foam, latex, coil spring, hybrid and inflatable air mattresses. In one embodiment, the support frame further comprises an adjustable suspension system to adjust the height of the support surface. The suspension system enables the user to position the first and second pillows at any desired height. In another embodiment, the support frame further comprises a suspension system having springs or elastic straps to adjust the height and tension of the pillows for supporting the face of the user.

In one embodiment, the apertures comprise at least two first apertures and at least two second apertures. The two first apertures are spaced apart from one another. The two second apertures are spaced apart from one another. In one embodiment, the first apertures are configured at a head of bed section. In one embodiment, the second apertures are configured at a foot of bed section. The two first apertures at the head of bed section are arranged parallel to the two second apertures at the foot of bed section.

Foam mattresses are typically designed for use in only one orientation in which the memory foam layer is above the core layer. Although a user would be free to flip the foam mattress to provide the core layer above the memory layer, it is not common. This is because the density of the core layer is typically so high that it would be prohibitively uncomfortable for use as a sleeping surface. For these reasons, foam mattresses are typically described as being "non-flippable" or "one-sided." Therefore, the foam mattresses are typically rotated foot-to-head and not flipped. When rotated, the head of bed section becomes the foot of bed section, wherein pillows ("plugs") are configured to removably receive within the respective aperture to plug the apertures at the foot of the bed on the mattress body to form the mattress having an even surface.

The therapeutic mattress further comprises one or more second pillows. The second pillow has a circular shape complementary to a shape of the aperture. The second pillows are configured to removably receive within the respective aperture to plug the apertures on the mattress body to form the mattress having an even surface. The therapeutic mattress further comprises a mattress case. The mattress case comprises a shape and configuration corresponding to a shape of the mattress body to cover the mattress. The mattress case comprises one or more pockets at a position corresponding to the apertures of the mattress. The pockets are configured to receive at least one of the first pillow and second pillow.

The therapeutic mattress further comprises a heating system disposed at one of the first pillow and the second pillow, a cooling system disposed at one of the first pillow and the second pillow and a sleep tracking system disposed at one of the first pillow and the second pillow. The sleep tracking system comprises at least one biometric sensor configured to track a sleeping pattern of the user. The therapeutic mattress further comprises one or more biometrics sensor disposed at the mattress body. The sensors are configured to track one or more biometric data of the user including heart rate and blood pressure of the user. The heating system, cooling system, sleep tracking system and the biometrics sensor are in communication with a user device associated with the user via at least one of a wired network and a wireless network.

The therapeutic mattress further comprises a power source to supply power to the heating system, cooling system and sleep tracking system (also commonly referred as system). The user device enables the user to receive and manage data from the system and enables the user to control the system.

In one embodiment, the mattress comprises a power source that powers the face pad. In practice, the face pad once inserted into the aperture, connects to an electrical contact from which electricity flows to the face pad. If the face pad herein comprises one or more electrical elements (e.g., one or more biometric sensors), the connected face pad then becomes powered to function. When the mattress herein comprises a power source and is electrically powered, it may also be connected to local area network. If so connected, it uses that connection to transmit data from the mattress and/or the face pad to a computer, a server, a cell phone or any sort of application placed upon any of the foregoing. In similar fashion, therapeutic mattress herein provides at least one BLUETOOTH® connection to one or more BLUETOOTH® connectable devices like cell phones and pad devices upon which one or more computer applications exist to receive, interpret and show received data from the mattress and/or face pad.

DETAILED DESCRIPTION OF EXAMPLE EMBODIMENTS

Example embodiments of the disclosure now will be described more fully hereinafter with reference to the accompanying drawings, in which example embodiments are shown. The concepts discussed herein may, however, be embodied in many different forms and should not be construed as limited to the example embodiments set forth herein; rather, these embodiments are provided so that this disclosure will be thorough and complete, and will fully convey the scope to those of ordinary skill in the art. Like numbers refer to like elements but not necessarily the same or identical elements throughout. The following presents non-limiting examples of an embodiment for a mattress assembly with suspension support. It is to be understood that while terms such as “left”, “right”, “top,” “bottom,” “front,” “back,” “side,” “rear,” and the like may be used in this specification to describe various example features and elements of the invention, these terms are used herein as a matter of convenience, e.g., based on the example orientations shown in the figures or the orientation during typical use.

Figure 1:
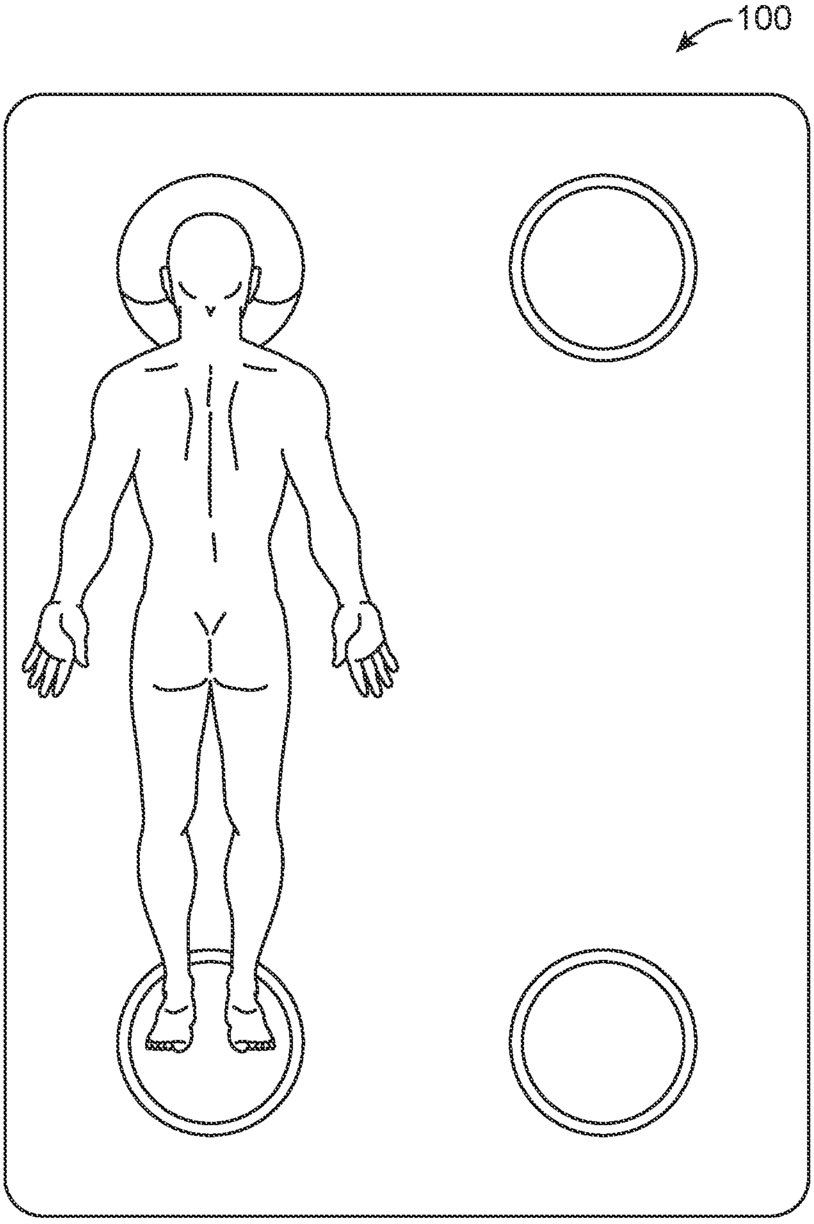
FIG. 1 exemplarily illustrates a perspective view of a therapeutic mattress and a user lying facing downwards on the therapeutic mattress, according to an embodiment of the present invention.
Figure 2:
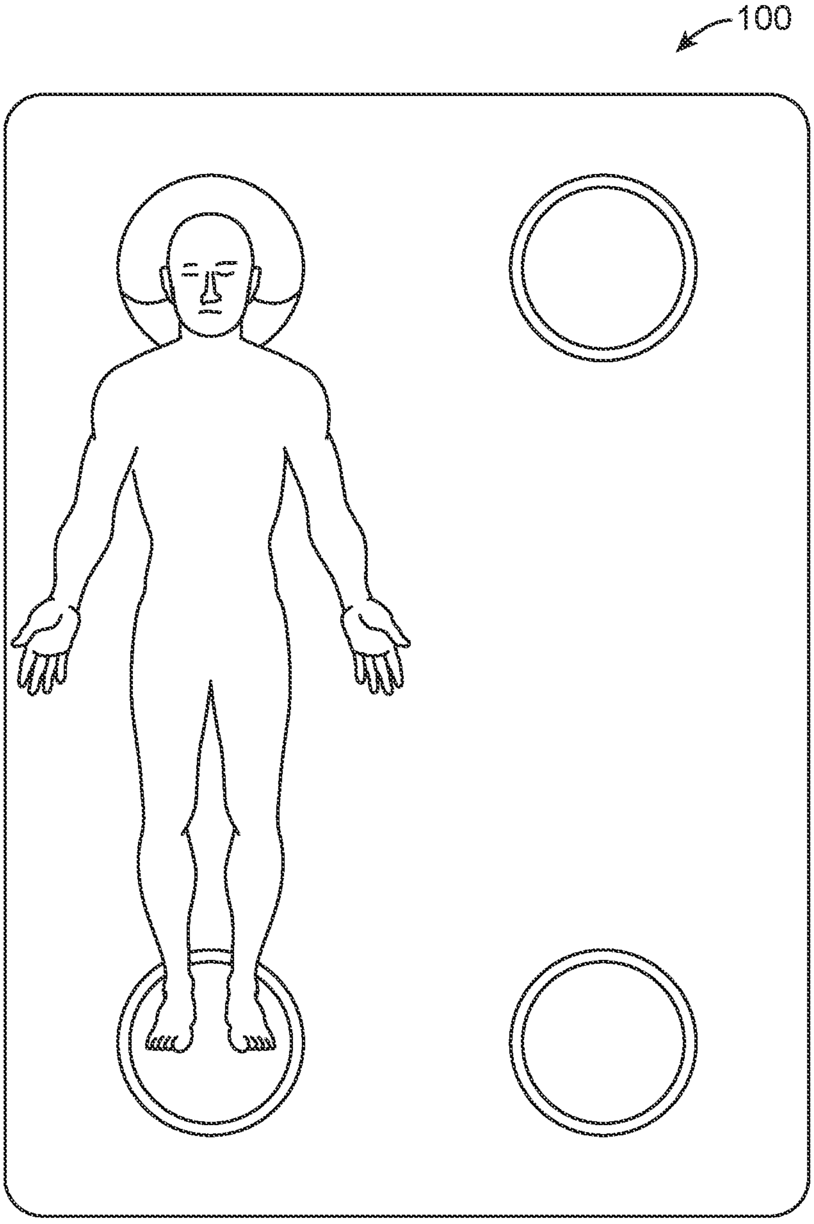
FIG. 2 exemplarily illustrates a perspective view of the therapeutic mattress and the user lying facing upwards on the therapeutic mattress, according to an embodiment of the present invention.

Referring the FIG. 1 and FIG. 2, the therapeutic mattress 100 is configured with an air passage that facilitates the user to comfortably sleep while facing downwards. The therapeutic mattress 100 is further to configured to facilitate the user to comfortably sleep while facing upwards. Also, the therapeutic mattress 100 could be reconfigured to have an even surface.

Figure 3:
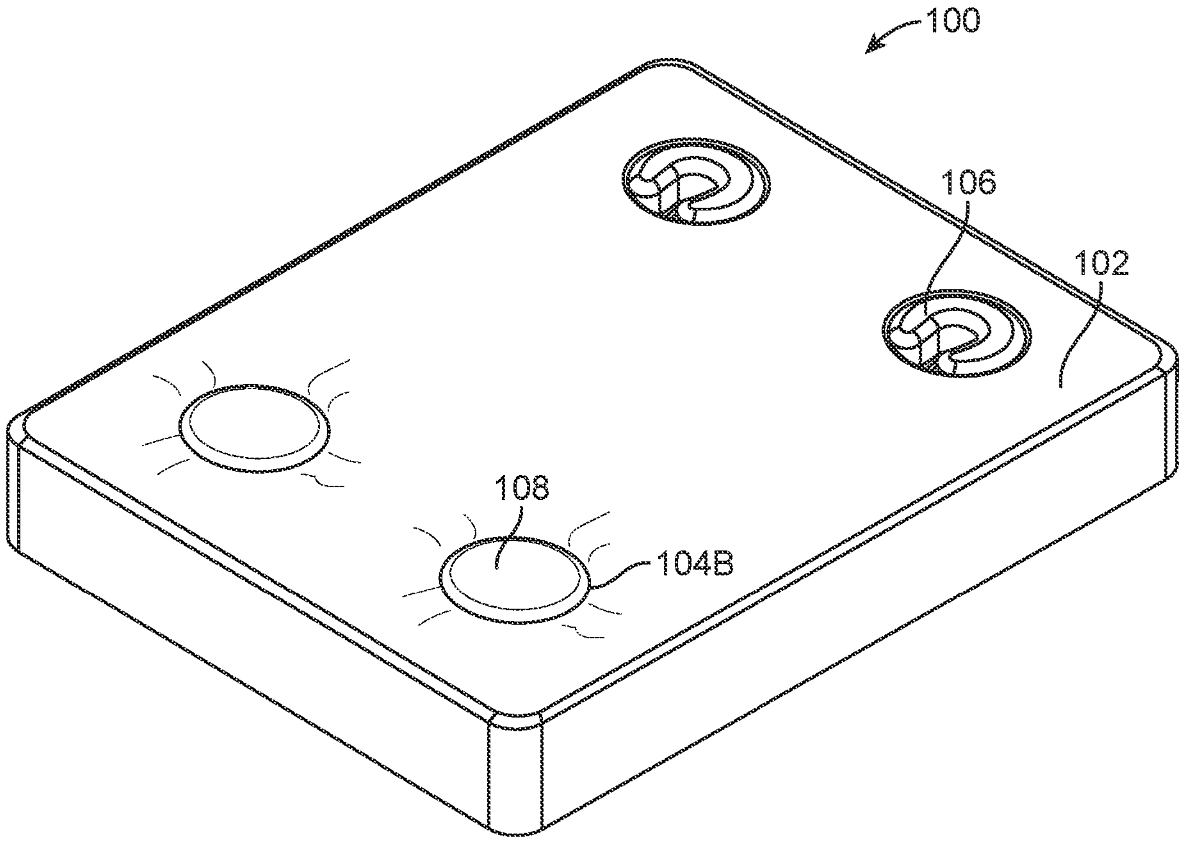
FIG. 3 exemplarily illustrates a perspective view of the therapeutic mattress having first pillows, according to an embodiment of the present invention.

Referring to FIG. 3, the mattress 100 comprises a mattress body 102 and one or more apertures (104A, 104B) (shown in FIG. 5) configured at the mattress body 102. The mattress body 102 comprises a head of bed section and a foot of bed section. The apertures (104A, 104B) include at least two first apertures 104A and at least two second apertures 104B. The first apertures 104A are configured at the head of bed section and the second apertures 104B are configured at the foot of bed section. The first apertures 104A are positioned parallel to the second apertures 104B.

Figure 4:
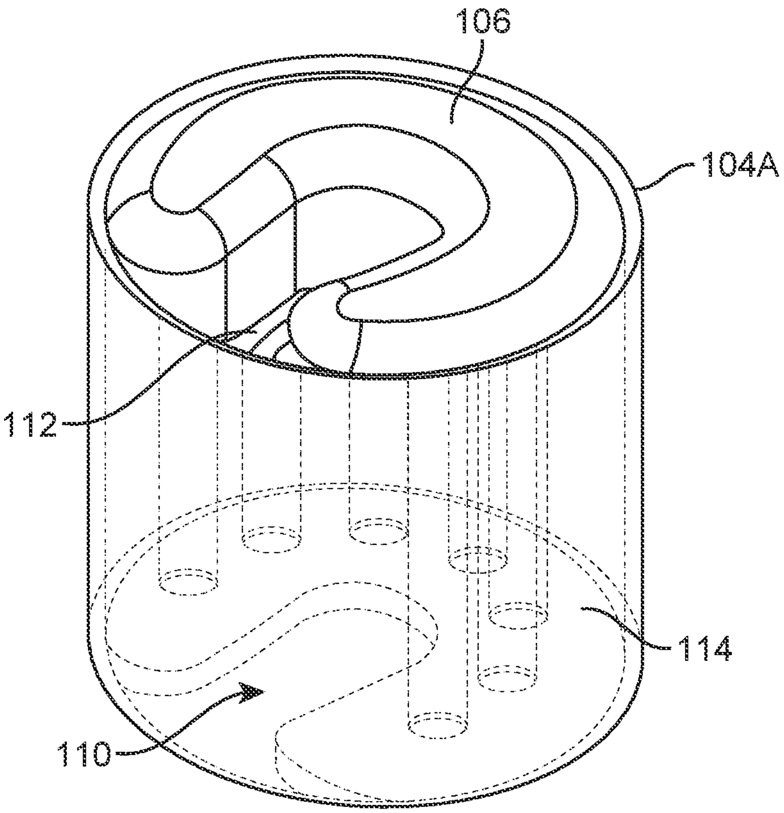
FIG. 4 exemplarily illustrates a see-through view of a support frame supporting the first pillow, according to an embodiment of the present invention.

Referring to FIG. 3 and FIG. 4, the mattress 100 further comprises one or more first pillows 106, one or more second pillows 108 and one or more support frames 110. At least one support frame 110 is disposed within the apertures (104A, 104B) to support at least one of first pillow 106 and second pillow 108. The support frame 110 comprises an air passage area therethrough. In an embodiment, the air passage area extends between two opposing external surfaces of the mattress 100. The first pillow 106 has a c-shaped configuration, which exposes a user’s head to the air passage area while lying on the mattress 100 facing downwards and enables the user to comfortably rest. The first pillow 106 and the second pillow 108 also commonly referred as pillows (106, 108).

Referring to FIG. 4, the support frame 110 has a support surface 112 to support the pillows (106, 108). The support surface 112 has a c-shape to support the first pillow 106. The C-shaped first pillow 106 and the support frame 110 create an air passage area. In one embodiment, the air passage area is an empty space that extends from the front external surface of the mattress 100 to the rear external surface of the mattress body 102. In one embodiment, the support frame 110 comprises a suspension system 114 that enables to adjust the height of the support surface 112, which in turn enables the user to position the pillows (106, 108) at any desired height.

Figure 5:
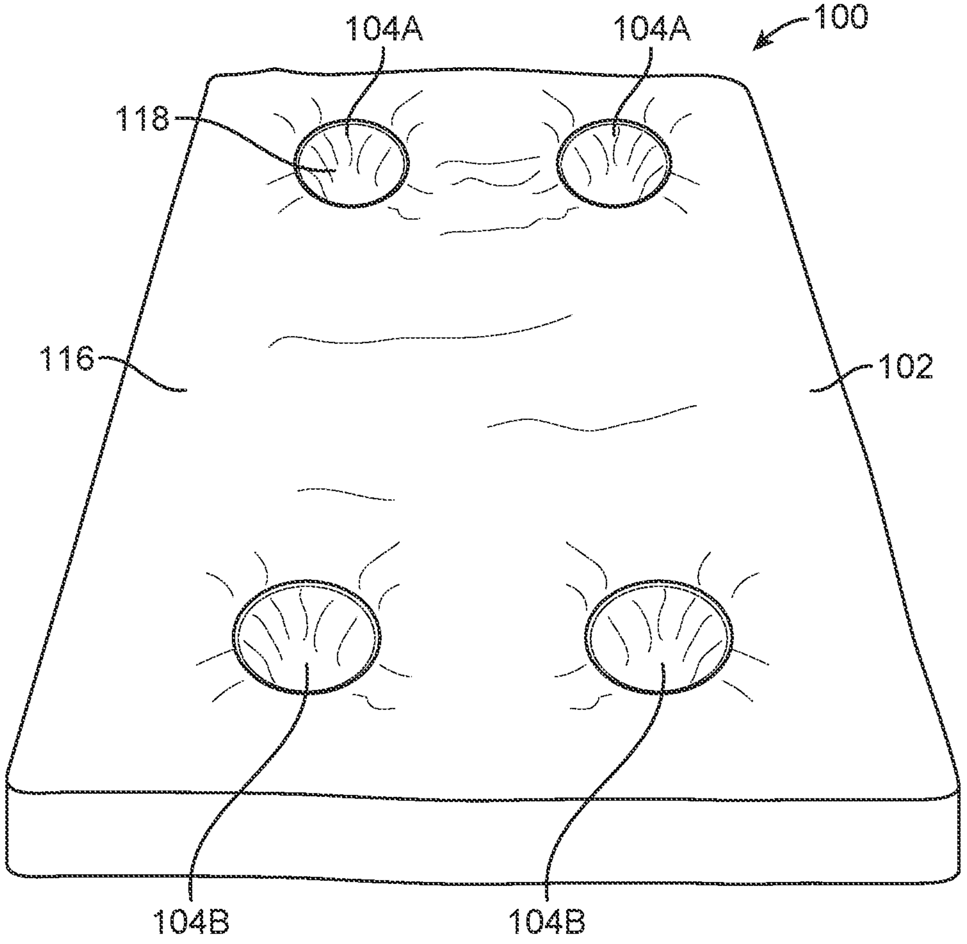
FIG. 5 exemplarily illustrates a perspective view of the therapeutic mattress having apertures without pillows, according to an embodiment of the present invention.

Referring to FIG. 5, at least two first apertures 104A formed at the head of bed section of the mattress 100 and at least two second apertures 104B formed at the foot of bed section of the mattress 100. The mattress 100 further comprises a mattress case 116 of corresponding shape and configuration covering the mattress 100. The mattress case 116 comprises one or more pockets 118 at a position corresponding to the position of the apertures (104A, 104B). The pockets 118 is configured to receive the pillows (106, 108). In one embodiment, the first pillow 106 are configured to fit the face of a human head and allow for proper air flow to the face of the user. Preferably, the first pillow 106 is sizable for differently sized faces. Further, the pillows (106, 108) contain soft padding.

Figure 6:
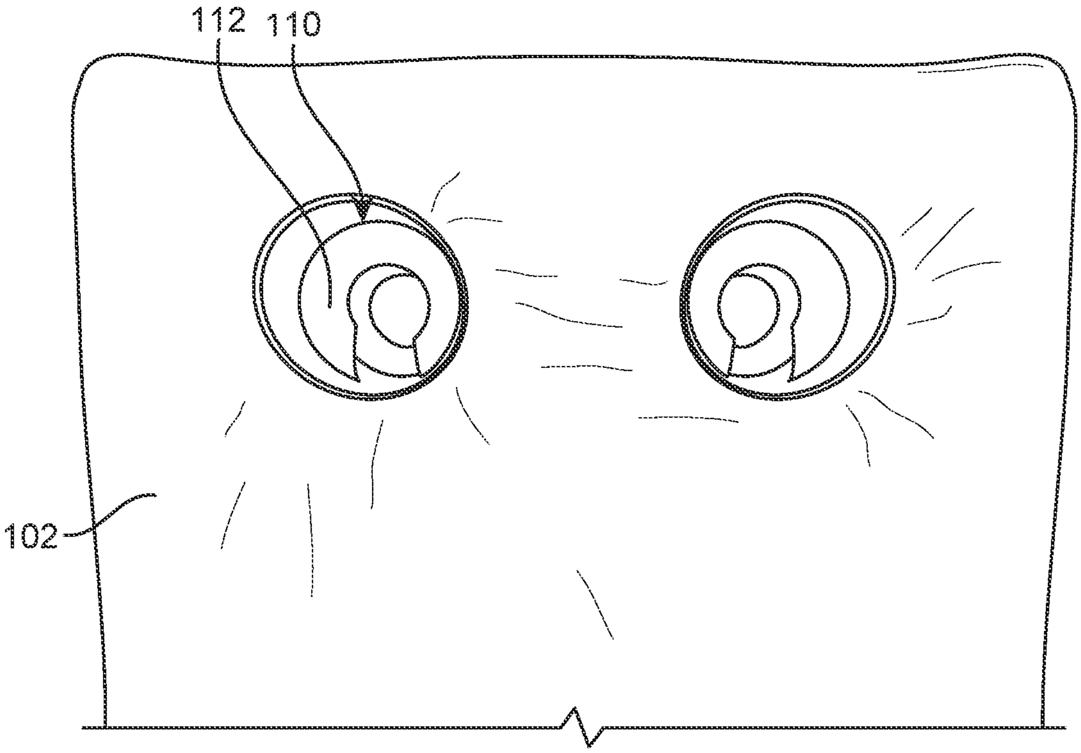
FIG. 6 exemplarily illustrates the support frames disposed within the apertures of the mattress, according to an embodiment of the present invention.
Figure 7:
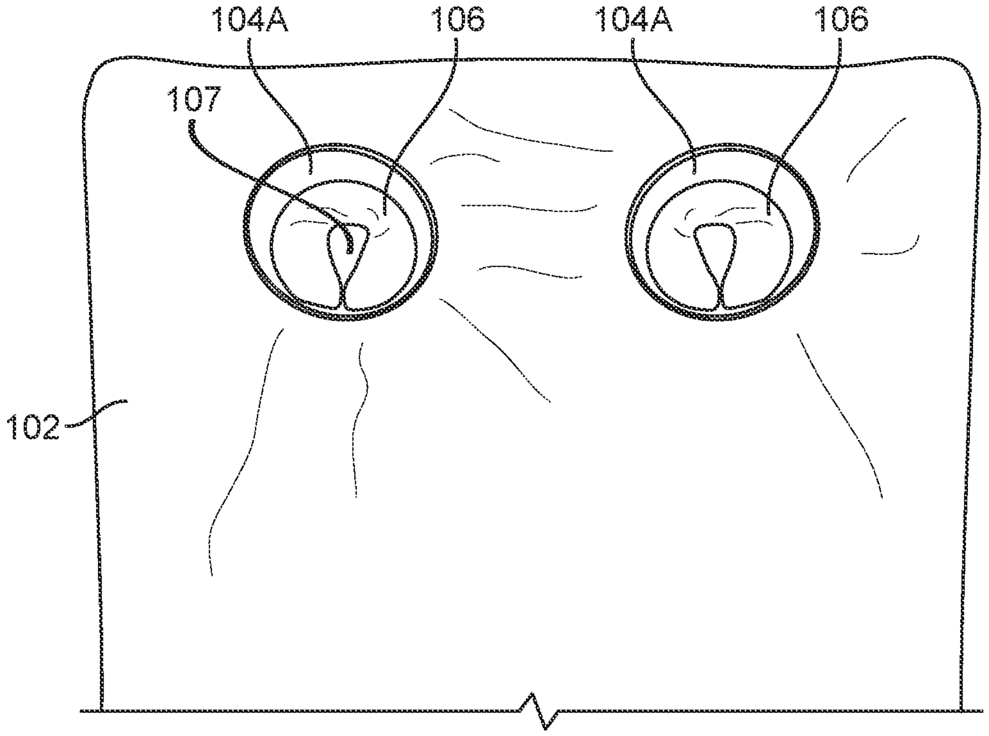
FIG. 7 exemplarily illustrates the first pillows disposed over the support frames of the mattress, according to an embodiment of the present invention.
Figure 8:
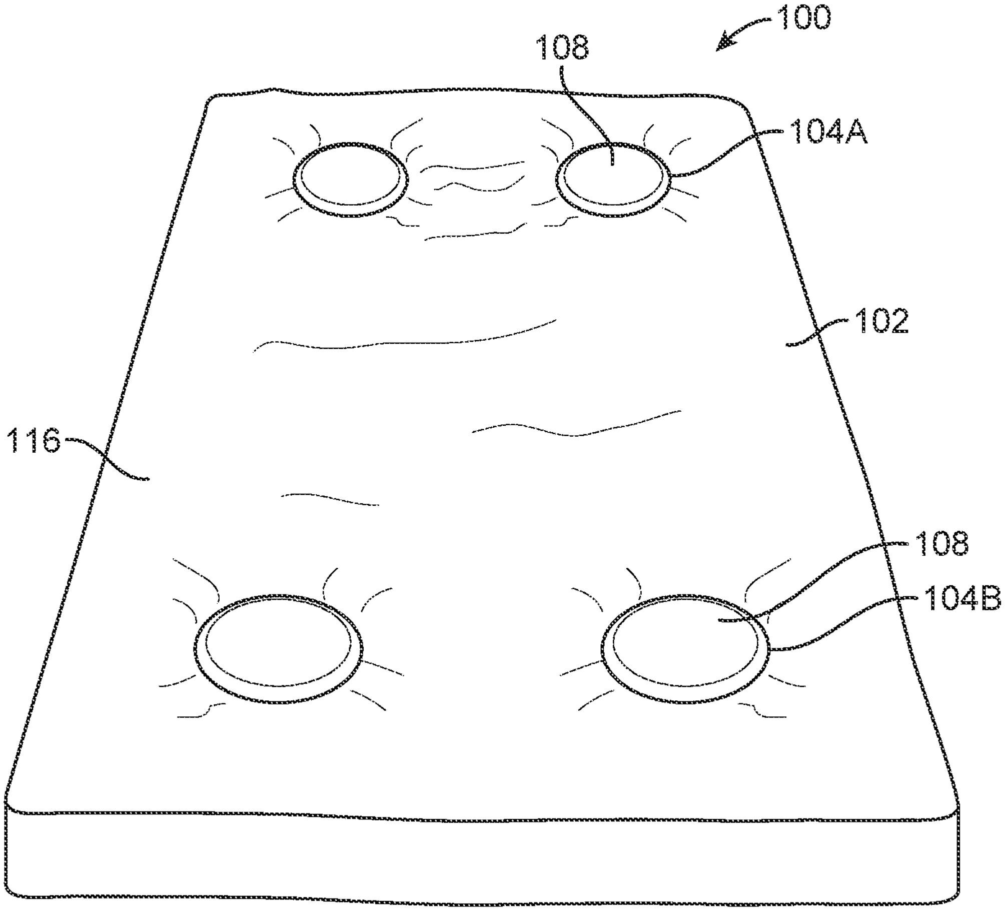
FIG. 8 exemplarily illustrates second pillows disposed over the support frames of the mattress, according to an embodiment of the present invention.

Referring to FIG. 6, the support frames 110 are disposed within each aperture (104A, 104B). The first pillow 106 is disposed above the support frame 110, as shown in FIG. 7. Referring to FIG. 8, in another embodiment, the second pillow 108 is disposed above the support surface 112 of the support frame 110. The second pillow 108 has a circular shape complementary to a shape of the aperture (104A, 104B). The second pillow 108 is configured to removably receive within the respective aperture (104A, 104B) to plug the apertures (104A, 104B) on the mattress body 102 to form the mattress 100 having an even surface.

In one embodiment, the mattress 100 composes of one or more layers. In another embodiment, the mattress 100 comprises at least three layers including a first layer, a second layer and a third layer. The second layer is disposed between the first layer and the third layer. The apertures (104A, 104B) extend from the first layer to the second layer. In another embodiment, the apertures (104A, 104B) extend from the first layer to the third layer.

As shown, opening 107 with the first pillow C-shaped configuration of the exists and allows the receipt and expulsion of air in user downward facing position. Air may also be taken in through second layer and third layers. In alternative embodiment, opening 107 may be designed to cause air to be expelled and received only through second and/or third layer. In that embodiment, such layers may provide filters through air is absorbed through that clean air flowing therethrough. Such filter may comprise a charcoal filter. Such an embodiment would be particularly beneficial for injured or sick users laying upon mattress for rest recovery purposes. In one or more embodiments, the second and/or third layers may be comprised of a plurality of springs or coils. As appreciated by one skilled in the art cores may come in all different forms and general provide support for the mattress.

In one aspect of the invention, the coils may be 16-gauge or 14-gauge coils. The higher gauge coils provide more resistance and thus create a flatter sleeping surface regardless of the sleeper's position. In one aspect of the invention each of the coils is individually wrapped. The individually wrapped coils prevent tangling, which allows the springs to move independently. By having independent movement in each spring, the mattress is able to resist bouncing along the entire sleeping surface of the mattress. This helps keep movement from transferring to the other side of the bed. Therefore, if two people are using the same mattress, the movement of one person will not resonate through the spring system and cause movement at the other side of the bed. Individually wrapped coils also allows for each wire to flex separately and therefore will conform to the individual contours of the body. Coils also provide the mattress with a much cooler feel, as air is easily removed through the coils from the top and bottom foam layers. Coils also provide enough bend for adjustable bases, which causes less wear and tear on moving parts, making the mattress usable for a longer period of time. The wire that makes up the coils may also be heat-treated and stress relieved. This aids the coils in holding their shape and thus provides a more durable consistent sleep surface. Coils may also be of varying buoyancy strategically designed to position comfort zones which support, for example, the hips, back, and shoulders. For example, having a nested center zoning would provide for more back support than a normal mattress. The high coil count in the center can also provide for an even surface across the entire mattress. Additionally, the coils may come pre-compressed. The pre-compressed coils create a firm surface that makes the unit more responsive to body movements.

In one embodiment, the pillows (106, 108) comprise a vibration system that is configured to provide vibration sensation to the user. The vibration system causes the pillows (106, 108) to vibrate against the head or face of the user. The pillows (106, 108) further comprise a heating system and a cooling system. In one embodiment, the heating system is configured to provide heat energy to warm the user's face or head. The cooling system is configured to cool the user's face or head.

In one embodiment, the pillows (106, 108) further comprise a sleep tracking system configured to track the sleeping pattern of the user. The sleep tracking system comprises one or more biometric sensors. In one embodiment, at least one biometric sensor is configured to track the sleeping pattern of the user, at least one biometric sensor is configured to track a blood pressure of the user and at least one biometric sensor is configured to track a heart rate of the user. In one embodiment, the sleep tracking system could be controlled using a user device associated with the user. Further, the heating system, cooling system and the vibration system could also be controlled using the user device. The sleep tracking system, the heating system, cooling system, the vibration system and the user device are configured to communicate data via at least one of a wired network and a wireless network.

The mattress 100 further comprises a power source. The power source is configured to supply power to one or more electronic and electrical components of the pillows (106, 108). The pillows (106, 108) further comprise electrical outlets to connect the electronic and electrical components of the pillows (106, 108) to the power source. Advantageously, the therapeutic mattress 100 is configured to facilitate the user to comfortably sleep while facing upwards, downwards, or in any other orientation. Also, the therapeutic mattress 100 could be reconfigured to have an even surface.

Although the features, functions, components, and parts have been described herein in accordance with the teachings of the present disclosure, the scope of coverage of this patent is not limited thereto. On the contrary, this patent covers all embodiments of the teachings of the disclosure that fairly fall within the scope of permissible equivalents.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A therapeutic mattress, comprising:

a mattress body comprising a head of bed section and a foot of bed section;

one or more apertures configured at the mattress body;

at least one support frame having a support surface disposed within the one or more apertures having an air passage area therethrough, one or more first pillows removably disposed above the support surface and within the one or more apertures, wherein the one or more first pillows are in a C-shaped configuration, and is configured to expose a user's head to the air passage area while lying on the mattress facing downwards and is configured to enable the user to comfortably rest, one or more second pillows having a circular shape complementary to a shape of the one or more apertures, wherein the one or more second pillows are configured to removably receive within the one or more apertures to plug the one or more apertures on the mattress body to form a mattress having an even surface, a heating system disposed at one of the one or more first pillows and the one or more second pillows;

a cooling system disposed at one of the one or more first pillows and the one or more second pillows;

a sleep tracking system disposed at one of the one or more first pillows and the one or more second pillows, the sleep tracking system comprises at least one biometric sensor configured to track a sleeping pattern of the user, one or more biometrics sensors disposed at the mattress body configured to track one or more biometric data of the user including heart rate and blood pressure of the user, wherein the heating system, cooling system, sleep tracking system and the one or more biometrics sensors are in communication with a user device associated with the user via at least one of a wired network and a wireless network, wherein the user device receives the one or more biometric data from the one or more biometric sensors and data from the heating system and the cooling system.

2. The therapeutic mattress of claim 1, wherein the support surface has a C-shaped surface to support the one or more first pillows.

3. The therapeutic mattress of claim 1, wherein the one or more apertures comprise at least two spaced apart first apertures and at least two spaced apart second apertures.

4. The therapeutic mattress of claim 3, wherein the first apertures are configured at the head of bed section.

5. The therapeutic mattress of claim 3, wherein the second apertures are configured at the foot of bed section.

6. The therapeutic mattress of claim 3, wherein the at least two first apertures at the head of bed section are arranged parallel to the at least two second apertures at the foot of bed section.

7. The therapeutic mattress of claim 1, further comprises a mattress case having a shape corresponding to a shape of the mattress body to cover the mattress.

8. The therapeutic mattress of claim 7, wherein the mattress case comprises one or more pockets at a position corresponding to the one or more apertures of the mattress, wherein the one or more pockets are configured to receive the at least one or more first pillows and the at least one or more second pillows.

9. The therapeutic mattress of claim 1, wherein the at least one support frame comprises a suspension system to adjust the height of the support surface, wherein the suspension system enables the user to position the one or more first pillows and one or more second pillows at any desired height.

10. The therapeutic mattress of claim 1, further comprises a power source to supply power to the heating system, cooling system and sleep tracking system.

11. The therapeutic mattress of claim 1, wherein the user device enables the user to control and manage the heating system, cooling system and sleep tracking system.

* * * * *